(12) United States Patent
Thakar et al.

(10) Patent No.: US 9,900,333 B2
(45) Date of Patent: Feb. 20, 2018

(54) SYSTEM AND METHOD FOR DETECTING VULNERABILITY STATE DELTAS

(71) Applicant: Qualys, Inc., Redwood Shores, CA (US)

(72) Inventors: Sumedh Thakar, San Jose, CA (US); Bharat Patel, Belmont, CA (US); Balaji Venkatesan, Foster City, CA (US); Tristan Burch, Denver, CO (US); Sean M. Molloy, Parker, CO (US); Matthew L. Wirges, West Bend, WI (US)

(73) Assignee: Qualys, Inc., Redwood Shores, CA (US)

( * ) Notice: Subject to any disclaimer, the term of this patent is extended or adjusted under 35 U.S.C. 154(b) by 30 days.

(21) Appl. No.: 14/614,920

(22) Filed: Feb. 5, 2015

(65) Prior Publication Data

US 2016/0234237 A1 Aug. 11, 2016

(51) Int. Cl.
*H04L 29/06* (2006.01)

(52) U.S. Cl.
CPC .............................. *H04L 63/1433* (2013.01)

(58) Field of Classification Search
CPC .................................. H04L 63/00; G06F 21/00
See application file for complete search history.

(56) References Cited

U.S. PATENT DOCUMENTS

| | | | |
|---|---|---|---|
| 2007/0124246 A1* | 5/2007 | Lawyer | G06Q 10/00 705/50 |
| 2010/0058478 A1* | 3/2010 | Shetty | G06F 21/10 726/26 |

* cited by examiner

*Primary Examiner* — Joseph P Hirl
*Assistant Examiner* — Leynna Truvan
(74) *Attorney, Agent, or Firm* — Baker & McKenzie LLP

(57) ABSTRACT

Described herein is a system and method for detecting vulnerability state deltas, the method comprising the steps of: receiving data related to a network connected device; determining a vulnerability state of the network connected device based upon the data; storing the vulnerability state in a vulnerability state database; receiving additional data related to the network connected device; determining an updated vulnerability state of the network connected device based upon the additional data; determining one or more deltas based upon differences between the vulnerability stare and the updated vulnerability state; and updating the stored vulnerability state with the updated vulnerability state.

20 Claims, 3 Drawing Sheets

SYSTEM AND METHOD FOR DETECTING VULNERABILITY STATE DELTAS

FIELD OF THE INVENTION

The presently described embodiments relate to vulnerability states of computing devices. The presently described embodiments disclose a system and method for detecting vulnerability state deltas.

BACKGROUND OF THE INVENTION

Computers and other network connected devices are often scanned to determine vulnerabilities. Typically the scans are performed once a week and result in large lists of vulnerabilities. Sometimes the scans are performed from outside of the network, other times the scans are performed from within the network. The resulting list of vulnerabilities may used to improve the security of the scanned network. The list is often very long and may report on items that are not vulnerabilities every time the scan is run. The system and method described herein introduce novel methods to address these issues and others.

SUMMARY OF THE INVENTION

The technology described herein provides a novel system and method for detecting vulnerability state deltas. Administrators of mature networks may desire to receive only a list of deltas (changes in state) when a network vulnerability scan is completed, rather than the complete list of detected vulnerabilities. It may be desirable to run pseudo-continuous network scans in order to provide the most current deltas. The scans may take place within and without the network and may provide data from various sources. The data may be compiled from the various sources into a vulnerability state. As new data comes in, deltas may be determined and reported as necessary.

These and other refinements provide various advantages over currently deployed systems and methods. Further refinements and novel solutions in the detection of vulnerability state delta detection are described herein.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components be omitted in certain figures for clarity of discussion. Reference is now made to the following descriptions taken in conjunction with the accompanying drawings, in which.

Although similar reference numbers may be used to refer to similar elements for convenience, it can be appreciated that each of the various example embodiments may be considered distinct variations.

DETAILED DESCRIPTION

Figure 1:
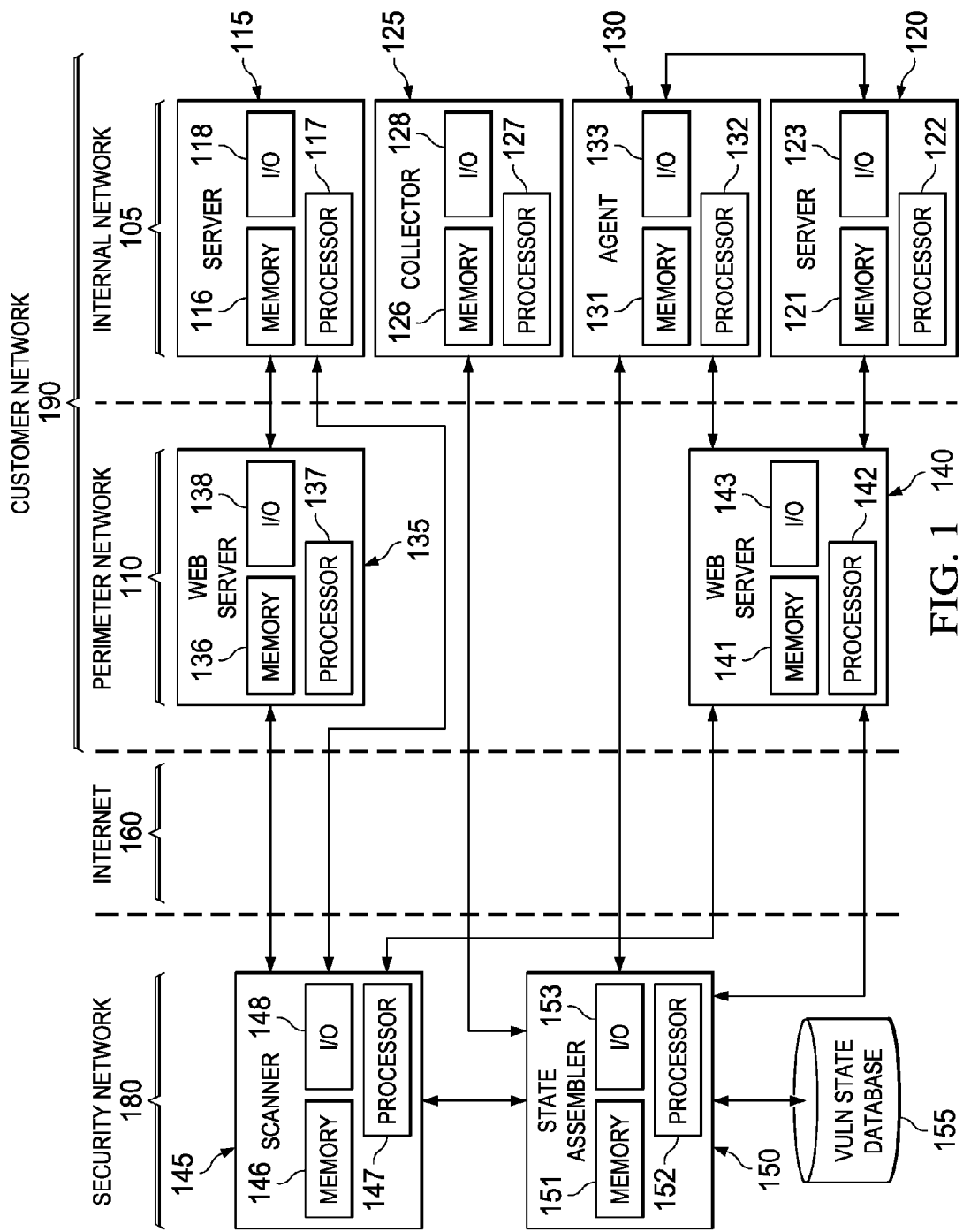
FIG. 1 is a block diagram of an embodiment of a system for detecting vulnerability state deltas in accordance with the disclosed principles.

In an embodiment, a vulnerability state of a machine may be determined. A vulnerability may be any type of weakness in a machine or network. For example, vulnerabilities may be found if certain ports are left open on a internet facing device; certain versions of operating systems may also be considered vulnerabilities; and any other potential weakness that may be exploited may be considered a vulnerability. Data regarding the machine's vulnerability state may be received from various sources. The various sources may include port scanners, network vulnerability scanners, database security scanners, host based vulnerability scanners, or other vulnerability testing devices. The data received from the various sources may be combined to determine a vulnerability state of the machine that has been scanned. In some cases the data received may be a vulnerability. In some other cases, rather than identifying the vulnerabilities during a scan of the machine, the machine's current state may be received and the state data may be evaluated for vulnerabilities.

The data used in determining vulnerabilities may come directly from the scanned machine, or may be retrieved from an echo of the machine stored in cloud storage. An echo is a snapshot of the machine's state that may be stored in cloud based storage or some other remotely accessible storage. The machine state may be characteristics and attributes of the machine or other information relevant for use in determining vulnerabilities of the machine. Scanning the echo for vulnerabilities rather than scanning the actual machine may free up resources at the machine and may allow scanning even if the machine is currently offline, e.g. not connected to a network.

The data may be gathered by devices outside the network the machine resides in, e.g., from outside a corporate network firewall, or from inside the network the machine resides in, e.g., from inside a corporate network firewall. Data gathered from outside of the network that the machine resides in, for example by scanning, may provide insight into how outsiders and potential hackers see the customer's network. Data gathered from inside of the network that the machine resides in, for example from an agent or other scanner deployed in the network, may help with detecting vulnerabilities that may only be found from within the network. For example, vulnerabilities may be caused by newly installed machines in the network, as well as other hard to scan areas inside the network. Data may also be gathered by a collector. A collector may receive data from devices that manage an environment, e.g., the customer's network. Thus, a device that manages a network where the scanned machine resides may be able to provide data for use in determining vulnerabilities of the machine. As an example, when using virtualization software such as VMware, there may be a machine inside a VMware server. There may also be VMware software that manages the VMware environment. The collector may talk to the VMware software to gather information about what the VMware software knows about the machine. Thus, the data gathered is about the machine, but not gathered directly by the collector from the machine.

In some embodiments, the data that may be analyzed for vulnerabilities may be gathered in a pseudo-continuous fashion. The vulnerability state may also be updated in a pseudo-continuous fashion. Continuous scanning of a system may cause problems with the availability of the system for its intended purpose. Continuous scanning may result in the network being unavailable for its intended users, similar to a denial of service (DoS) network attack. Thus, pseudo continuous scanning, in other words, as much scanning as possible without adversely affecting availability of the machine or network may be used. Pseudo-continuous scanning may be different than the scanning employed by many network scanning systems, which may use a weekly scan that returns one large data set. Weekly scans present a problem of one very large result set. Large result sets require more time and processing power to analyze and may result in vulnerabilities being missed. Further, periodic scanning may result in vulnerabilities that exist for several hours or days before detection. Some embodiments may use continuous scanning if the scanned machine and network are capable of handling the increased traffic and processing that results from a continuous scan.

In some embodiments, to reduce the impact of scanning on a network or device, the network or device may be scanned in a piecemeal fashion. For example, a customer may decide to scan a first portion of a machine or network at time A and then the remaining portion at time B. Scanning only a part of the device or network may result in a lower impact to network resources. In this case, scan A and scan B would need to be combined in order to have a complete status of the network.

Sometimes, the data related to a scanned network or machine received from a first source may overlap with data related to the scanned network or machine received from a second source. For example, a first scan may indicate that a port is closed, while a second scan may indicate that the same port is open. When conflicting data is received, a determination may be made as to which source is more reliable, and the data from the more reliable source may be used for determining the vulnerability state. Continuing the example, a decision may be me made as to which scan is authoritative regarding the port. The decision may be based on thoroughness of the scans, proximity of the scanner, or other relevant factors.

There are several ways a vulnerability delta may exist. In some cases, a current vulnerability state may be different from a previous vulnerability state. In these cases, the differences between the two states would be considered deltas. As an example, a technician may install a new application on a monitored computer, if the application is not up to date, it may contain one or more vulnerabilities. In this case a delta would exist because of the newly installed application. In some other cases, a previously unknown vulnerability may be discovered. In these cases, the current vulnerability state may contain the newly discovered vulnerability, resulting in a delta. As an example, a zero day exploit may be discovered by a network security professional. A notification may be sent to the network monitoring systems to monitor for the newly discovered vulnerability. Some machines may be vulnerable to the exploit, and thus a delta may exist, even though the state of the machine has not changed.

Rather than reporting the entire vulnerability state to the end user each time scan data is received and the vulnerabilities are updated, only the deltas may be reported to the end user. Reporting deltas may be useful for systems that have a mature state and see a minimal amount of change to configurations of machines and/or the network. Even if the system is not mature, reporting deltas may be useful for reducing the length of reports network security users are responsible for reviewing as well as other advantages gained by providing deltas to users. In some cases, the end user may configure the system such that only specific deltas are alerted on. Thus, only a subset of deltas may be sent to the end user as alerts.

As used herein, processors may control actions of a device or machine. Any actions described as being taken by a processor might be taken by the processor alone or by the processor in conjunction with one or more additional components. Additionally, while only one processor may be shown in certain devices, multiple processors may be present. Thus, while instructions may be discussed as being executed by a processor, the instructions may be executed simultaneously, serially, or otherwise by one or multiple processors. A processor may be implemented as one or more CPU chips and may be a hardware device capable of executing computer instructions. The processor may execute instructions, codes, computer programs, or scripts. The instructions, codes, computer programs, or scripts may be received from an I/O module or from memory.

As used herein, an I/O module may include modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. I/O modules may also include liquid crystal displays (LCDs), touch screen displays, keyboards, keypads, switches, dials, mice, track balls, voice recognizers, card readers, paper tape readers, printers, video monitors, or other well-known input/output devices.

As used herein, memory may include random access memory (RAM), read only memory (ROM), or various forms of secondary storage. RAM may be used to store volatile data and/or to store instructions that may be executed by a processor. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution.

FIG. 1 is a block diagram of an embodiment of a system for detecting vulnerability state deltas. A customer network 190 may be made up of an internal network 105 and a perimeter network 110. Internal network 105 may contain servers 115 120. While two servers 115 120 are shown, it should be understood that any number of servers may be present in internal network 105. Additionally, the servers 115 120 may coexist on a single physical machine, or may each be their own separate machine. Server 115 may comprise a memory 116, processor 117, and an I/O module 118. Server 120 may comprise a memory 121, processor 122, and an I/O module 123. Server 115 120 may be mail servers, data servers, or any other type of server that resides within a network.

Internal network 105 may also contain collector 125. Collector 125 may comprise a processor 127, memory 126 and an I/O module 128. Collector 125 may be used to gather data about devices in the customer network 190 without actually interacting with the devices that the data is related to. For example, collector 125 may interact with various network control devices to gather information from the network control devices about the other machines in the customer network 190. Collector 125 may provide the data or vulnerability information to state assembler 150.

Internal network 105 may also include agent 130. Agent 130 may comprise a memory 131, a processor 132, and/or an I/O module 133. While agent 130 is depicted as a single block, agents 130 may installed on each machine in the customer network 190, or several agents 130 may monitor the machines in the customer network 190. Agent 130 may scan the internal network 105 for vulnerabilities and other data. Agent 130 may scan server 120 for vulnerabilities and/or other data related to the current state of server 120. Agent 130 may also scan the internal facing side of web server 140 for vulnerabilities and/or other data related to the current state of web server 140. Agent 130 may provide the data or vulnerability information to state assembler 150.

While agent 130 and collector 125 are depicted as separate blocks, in some embodiments agent 130 and collector 125 may reside in a single appliance, or on other servers within the network, or both. Further, more than one agent 130 and collector 125 may be present in an internal network.

Perimeter network 110 may contain webs servers 135 140. While two webs servers 135 140 are shown, any number may be used in perimeter network 110. Web server 135 may comprise a memory 136, a processor 137, and an I/O module 138. Web server 140 may comprise a memory 141, a processor 142, and an I/O module 143. Perimeter network 110 may act as a network between internal network 105 and internet 160. Perimeter network 110 may also be referred to as a DMZ. External users may only access internal network 105 via perimeter network 110. A hacker or other malicious actor may gain access to internal network 105 by going through perimeter network 110, in some cases by compromising an external network device, for example webservers 135 140.

Security network 180 may be an external secure network that assists in monitoring customer network 190. Security network 180 may contain a scanner 145. Scanner 145 may comprise a memory 146, a processor 147, and an I/O module 148. While only one scanner 145 is depicted, any number of scanners 145 may be deployed in security network 180. Scanner 145 may be used to scan the external facing portion of web servers 135 140. Scanner 145 may be used to determine vulnerabilities of the web servers 135 140. Scanner 145 may be used to approximate the view a hacker or other outsider may have of customer network 190 from an entity external to customer network 190. In some embodiments, scanner 145 may not identify vulnerabilities, but may instead take a snapshot of the current state of web servers 135 140. In any case, wither the current state or the vulnerability data may be provided to state assembler 150.

State assembler 150 may comprise a memory 151, a processor 152 and an I/O module 153. State assembler 150 may receive data from various sources including scanner 145, collector 125, and/or agent 130. The data may include a current state of a machine and/or vulnerabilities associated with the machine. State assembler 150 may use the data to create a vulnerability state for machines in customer network 190. The state assembler 150 may use data from one, some, or all of the data sources to create the vulnerability state. For example, the vulnerability state may be based only on data from scanner 145, or vulnerability state may be based on data from any combination of sources. Vulnerability state database 155 may be used by state assembler 150 to store vulnerability states of various machines. When new data is received by the state assembler 150, the vulnerability state may be updated and any differences between the stored vulnerability state and the new vulnerability state may be reported as deltas to users in the customer network 190 and/or users in the security network 180.

Figure 2:
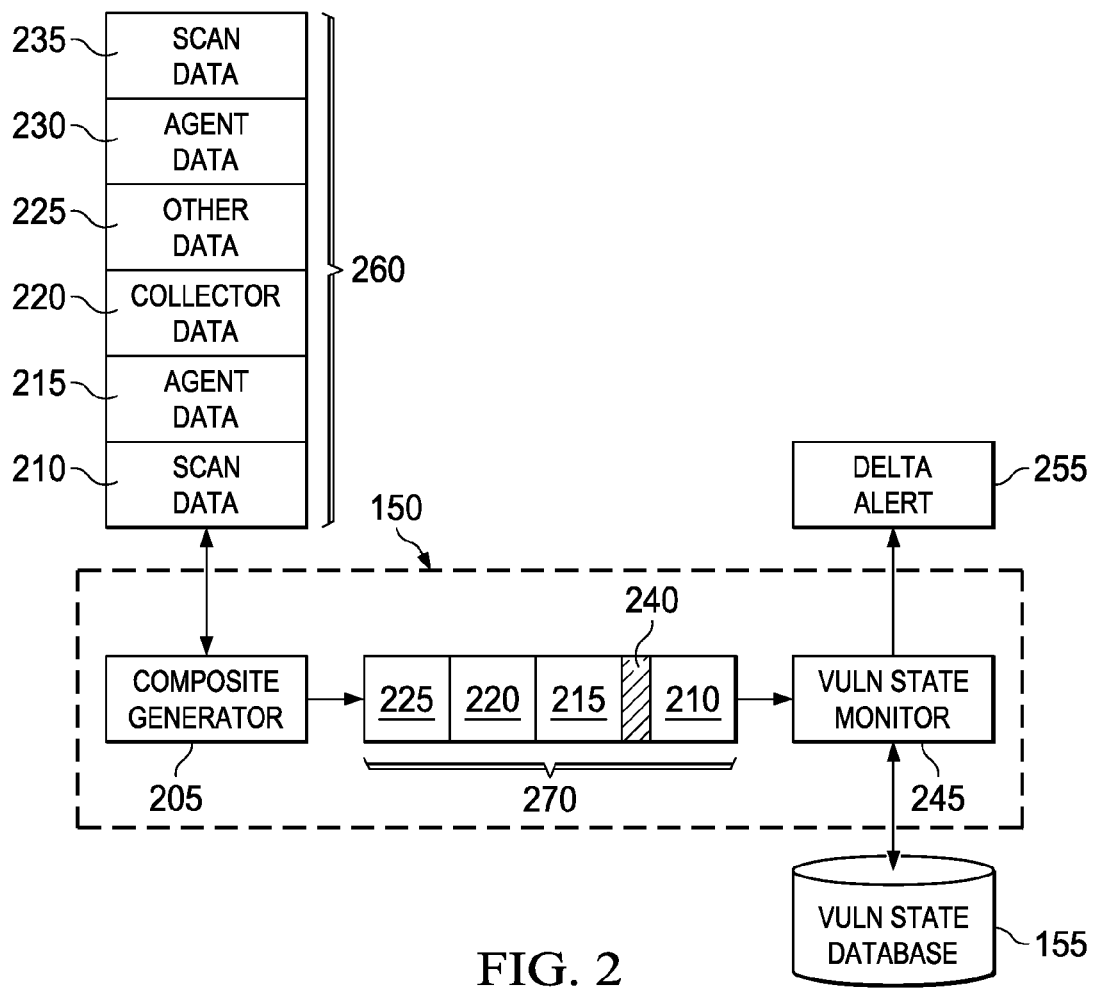
FIG. 2 is a data flow diagram of an embodiment of a system for detecting vulnerability state deltas.

FIG. 2 is a data flow diagram of an embodiment of a system for detecting vulnerability state deltas. State assembler 150 may comprise a composite generator module 205 and a vulnerability state monitor 245. Composite generator module 205 may receive a flow of data 260 from various sources. The flow 260 may comprise scan data 210, agent data 215, collector data 220, other data 225, second agent data 230, and second scan data 235. The various data received may relate to one or many monitored machines. Scan data 210 may be received from web-based scanners, agent data 215 may be received from agents installed in a customer's network, collector data 220 may be received from collectors with knowledge of the customer's network, and other data 225 may come from various other sources that may provide data related to machines in the customer's network. The flow 260 may be received in series, one data source at a time, or in some cases may be received in parallel, more than one data source at a time. Processing by the composite generator 205 of the various data in the flow 260 may occur in parallel or series. The flow 260 may contain data related to one customer's network, or many customers' networks.

Composite generator 205 may receive data in flow 260 related to a monitored machine and combine the data related to the monitored machine to create a composite view 270 of the monitored machine based upon the received data. While only one composite view 270 is shown, many composite views may be created based upon the number of monitored machines. Composite generator 205 may also determine which of a plurality of monitored machines a piece of data is from based upon information contained within the data. For example, if two machines are being monitored, composite generator 205 may analyze the received data in flow 260 and determine which of the two machines the data is related to based upon information contained in the data.

Composite view 270 may be made up of scan data 210, agent data 215, collector data 220, and other data 225. While the composite view 270 shown here is made up of four data sources, it may be made up of any number of data sources. Region 240 of composite view 270 may indicate an overlap of data provided by scan data 210 and agent data 215. While the overlap 240 is shown between scan data 210 and agent data 215, the overlap may occur between any data sources that provide data related to a machine. As an example, scan data 210 may indicate that a port is open on a machine, agent data 215 may indicate that the port is closed on the machine. Thus, because both data describe the port, they are considered to overlap. When there is an overlap 240 and there is conflicting data in the overlap 240, a decision must be made as to which data is more reliable. In this case, agent data 215 may be found to be more reliable because the agent that provides agent data 215 may reside within a customer network and the scanner that provides scan data 210 may be outside of the customer network. Various other criteria may be used to determine the reliability of received data.

Composite generator module 205 may transmit the composite view 270 to vulnerability state monitor 245 after resolving any overlaps. Vulnerability state monitor 245 may determine a vulnerability state of a machine that the composite view 270 describes. The composite view 270 may contain a listing of vulnerabilities of the machine, or data about the machine, which the vulnerability state monitor 245 uses to determine vulnerabilities. Once the vulnerability state of the machine is determined it may be stored in vulnerability state database 155.

At some point in time after composite view 270 has been generated and transmitted to vulnerability state monitor 245, the composite generator 205 may receive second agent data 230 and second scan data 235. Although not pictured here, additional data from various sources may also be received at any time. The composite generator may update composite view 270 based upon the second agent data 230 and second scan data 235. The updated composite view may then be transmitted to vulnerability state monitor 245 where an updated vulnerability state may be generated and compared to the stored vulnerability state in the vulnerability state database 155. Any differences between the stored vulnerability state and the updated vulnerability state may be referred to as deltas. When deltas are found by vulnerability state monitor 245, a delta alert 255 may be transmitted to an interested user. In some cases, the interested user may wish to be notified about only certain types of deltas. In this case, vulnerability state monitor 245 may have stored a list of preferences as to which deltas result in a delta alert 255.

Composite generator module 205 may continuously receive additional data from the various data sources regarding monitored machines. Composite generator 205 may update composite views for each monitored machine as soon as the additional data is received. Thus, the deltas are provided in real time based upon continuous monitoring of the machines. In other embodiments, deltas may be updated periodically based on time or amount of data received or other factors that may trigger a change in vulnerabilities.

Figure 3:
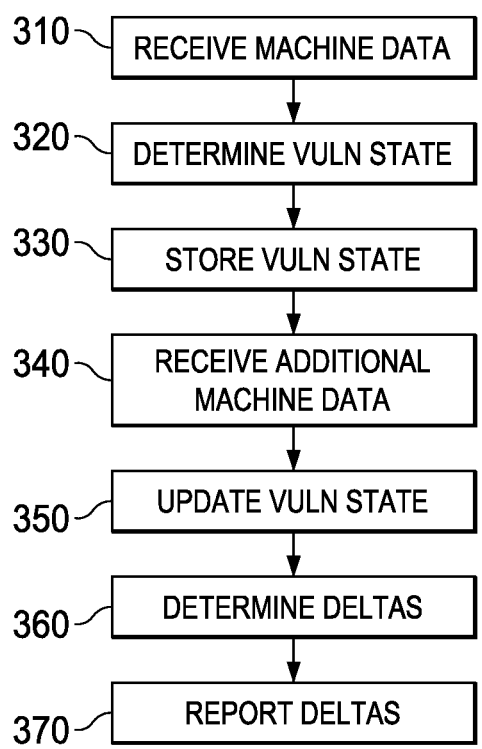
FIG. 3 is a flow diagram of an embodiment of a method for detecting vulnerability state deltas.

FIG. 3 is a flow diagram of an embodiment of a method for detecting vulnerability state deltas. At step 310, a state assembler may receive data related to a machine. The data may include the machine's vulnerabilities or other status data related to the machine. The data may be received from one or many sources. In some cases the resources described by the data may overlap, in these cases, the state assembler may make a determination as to which source is more accurate and use the data from the more accurate source. Once the data has been received, a vulnerability state of the machine is determined at step 320. The vulnerability state may be determined by choosing data that is the most reliable and combining the data from various sources to make a single vulnerability state for each machine. The vulnerability state may be stored at step 330. When the next iteration of data collection is complete, the data may be provided to the state assembler at step 340. The state assembler may update the vulnerability status at step 350. At step 360, the state assembler or other comparator may compare the stored vulnerability state with the updated vulnerability state to determine deltas between the two. Any differences between the states may be reported as deltas at step 370.

As used herein, networks may represent any form of communication network between connected machines and any other network elements, and may also represent a collection of machines or virtual machines operable to provide cloud computing services to users. Networks may include a public cloud or a private cloud. Networks may include routers, hubs, switches, firewalls, content switches, gateways, call controllers, and/or any other suitable components in any suitable form or arrangement. Networks may include, in whole or in part, one or more secured and/or encrypted Virtual Private Networks (VPNs) operable to couple one or more network elements together by operating or communicating over elements of a public or external communication network. Computing devices may include any device with a network interface, which includes, but is not limited to, network components, desktop computers, laptops, or mobile devices.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

As referred to herein, a machine or computing device may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during,"

"substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for detecting vulnerability state deltas comprising the steps of:
   receiving first and second data related to a device connected to a network, wherein the first data is received from a first source, and wherein the second data is received from a second source;
   combining the first and second data to generate first combined data;
   identifying a first overlap in the first combined data, wherein a first data entry of the first data conflicts with a second data entry of the second data in the first combined data;
   resolving the first overlap by:
      determining that the first source is more reliable than the second source based upon the first source being located within the network and the second source being located external to the network; and
      including the first data entry in the first combined data and not including the second data entry in the first combined data;
   determining a first vulnerability state of the device based upon the first combined data;
   storing the first vulnerability state in a vulnerability state database;
   receiving third and fourth data related to the device, wherein the third data is received from a third source, and wherein the fourth data is received from a fourth source;
   combining the third and fourth data to generate second combined data;
   identifying a second overlap in the second combined data, wherein a third data entry of the third data conflicts with a fourth data entry of the fourth data in the second combined data;
   resolving the second overlap by:
      determining that the third source is more reliable than the fourth source based upon the third source being located within the network and the fourth source being located external to the network; and
      including the third data entry in the second combined data and not including the fourth data entry in the second combined data;
   determining a second vulnerability state of the device based upon the second combined data;
   storing the second vulnerability state in the vulnerability state database; and
   detecting a vulnerability state delta for the device based upon determining a difference between the first vulnerability state and the second vulnerability state.

2. The method of claim 1, wherein each of the first and third sources comprises one or more of a collector and an agent, and each of wherein the second and fourth sources comprise web scanners.

3. The method of claim 1, further comprising:
   determining the first data and the second data both describe a resource of the device.

4. The method of claim 1 further comprising:
   determining the third data and the fourth data both describe a resource of the device.

5. The method of claim 1, wherein the first source is the same as the third source, and wherein the second source is the same as the fourth source.

6. The method of claim 1 further comprising:
   creating a notification in response to detecting the vulnerability state delta, wherein the notification identifies the vulnerability state delta; and
   transmitting the notification.

7. The method of claim 1, wherein the third and fourth data is received in a pseudo-continuous fashion, wherein the second vulnerability state is determined in a pseudo-continuous fashion, and wherein the vulnerability state delta is detected in a pseudo-continuous fashion.

8. The method of claim 1, wherein each of the first, second, third, and fourth data comprises information descriptive of vulnerabilities associated with the device or a current state of the device.

9. The method of claim 1, wherein at least one of the first, second, third, and fourth data is received in response to scanning the device.

10. The method of claim 1, wherein storing the second vulnerability state in the vulnerability state database comprises overwriting the first vulnerability state with the second vulnerability state in the vulnerability state database.

11. A device for detecting vulnerability state deltas comprising:
   a memory; and
   a processor configured to:
      receive first and second data related to a device connected to a network, wherein the first data is received from a first source, and wherein the second date is received from a second source;
      combine the first and second data to generate first combined data;
      identify a first overlap in the first combined data, wherein a first data entry of the first data conflicts with a second data entry of the second data in the first combined data;
      resolve the first overlap by:
         determining that the first source is more reliable than the second source based upon the first source being located within the network and the second source being located external to the network; and
         including the first data entry in the first combined data and not including the second data entry in the first combined data;

determine a first vulnerability state of the device based upon the first combined data;

store the first vulnerability state in a vulnerability state database;

receive third and fourth data related to the network connected device, wherein the third data is received from a third source, and wherein the fourth data is received from a fourth source;

combine the third and fourth data to generate second combined data;

identify a second overlap in the second combined data, wherein a third data entry of the third data conflicts with a fourth data entry of the fourth data in the second combined data;

resolve the second overlap by:
  determining that the third source is more reliable than the fourth source based upon the third source being located within the network and the fourth source being located external to the network; and
  including the third data entry in the second combined data and not including the fourth data entry in the second combined data;

determine a second vulnerability state of the device based upon the second combined data;

storing the second vulnerability state in the vulnerability state database; and detecting a vulnerability state delta based upon determining a difference between the first vulnerability state and the second vulnerability state.

12. The device of claim 11, wherein each of the first and third sources comprises one or more of a collector and an agent, and wherein each of the second and fourth sources comprises web scanners.

13. The device of claim 11, wherein the processor is further configured to:
  determine the first data and the second data both describe a resource of the device.

14. The device of claim 11, wherein the processor is further configured to:
  determine the third data and the fourth data both describe a resource of the device.

15. The device of claim 11, wherein the first source is the same as the third source, and wherein the second source is the same as the fourth source.

16. The device of claim 11, wherein the processor is further configured to:
  create a notification in response to detecting the vulnerability state delta, wherein the notification identifies the vulnerability state delta; and
  transmit the notification.

17. The device of claim 11, wherein the third and fourth data is received in a pseudo-continuous fashion wherein the second vulnerability state is determined in a pseudo-continuous fashion, and wherein the vulnerability state delta is detected in a pseudo-continuous fashion.

18. The device of claim 11, wherein each of the first, second, third, and fourth data comprises information descriptive of vulnerabilities associated with the device or a current state of the device.

19. The device of claim 11, wherein at least one of the first, second, third, and fourth data is received in response to scanning the device.

20. The device of claim 11, wherein storing the second vulnerability state in the vulnerability state database comprises overwriting the first vulnerability state with the second vulnerability state in the vulnerability state database.

* * * * *